US009714351B2

(12) United States Patent
Scadding et al.

(10) Patent No.: US 9,714,351 B2
(45) Date of Patent: Jul. 25, 2017

(54) COMPOSITION

(71) Applicant: Chameleon Innovations Australia (CIA) Pty Ltd, Perth, Western Austrailia (AU)

(72) Inventors: Cameron Jay Scadding, Landsdale (AU); Rachel Louis Scadding, Landsdale (AU); Roger John Watling, Jandakot (AU); Christopher David May, Canning Vale (AU); Craig Manuel Pages-Oliver, Mount Pleasant (AU); Nina Hobson, Roleystone (AU)

(73) Assignee: Chameleon Innovations Australia (CIA) Pty Ltd, Perth, Western Australia (AU)

( * ) Notice: Subject to any disclaimer, the term of this patent is extended or adjusted under 35 U.S.C. 154(b) by 217 days.

(21) Appl. No.: 14/409,817

(22) PCT Filed: Jun. 19, 2013

(86) PCT No.: PCT/AU2013/000656
§ 371 (c)(1),
(2) Date: Dec. 19, 2014

(87) PCT Pub. No.: WO2013/188916
PCT Pub. Date: Dec. 27, 2013

(65) Prior Publication Data
US 2015/0191611 A1    Jul. 9, 2015

(30) Foreign Application Priority Data

Jun. 19, 2012 (AU) ................................ 2012902570
Aug. 6, 2012 (AU) ................................ 2012211401

(51) Int. Cl.
*C09D 11/50* (2014.01)
*C09D 7/12* (2006.01)
(Continued)

(52) U.S. Cl.
CPC .................. *C09D 7/12* (2013.01); *C08K 3/22* (2013.01); *C08K 5/0091* (2013.01); *C08K 5/56* (2013.01);
(Continued)

(58) Field of Classification Search
CPC ............................. C09D 11/50; C09D 11/037
See application file for complete search history.

(56) References Cited

U.S. PATENT DOCUMENTS

| 3,377,292 A | 4/1968 | Halverson | |
| 2006/0189113 A1* | 8/2006 | Vanheusden | .......... B22F 1/0018 438/597 |
| 2007/0281139 A1* | 12/2007 | Mehta | .................... B41M 3/142 428/195.1 |

FOREIGN PATENT DOCUMENTS

| WO | WO-97/10307 A1 | 3/1997 |
| WO | WO-98/04640 A1 | 2/1998 |

(Continued)

OTHER PUBLICATIONS

International Search Report and Written Opinion of the ISA, ISA/AU, Woden ACT, mailed Sep. 5, 2013.
(Continued)

*Primary Examiner* — Veronica F Faison
(74) *Attorney, Agent, or Firm* — Harness, Dickey & Pierce, P.L.C.

(57) ABSTRACT

A composition for the marking of assets comprising:
 a base material; and
 two or more encoding compounds
wherein each of the two or more encoding compounds are provided at measurable concentrations.

18 Claims, 2 Drawing Sheets

(51) Int. Cl.
*C08K 5/00* (2006.01)
*C08K 3/22* (2006.01)
*C08K 5/56* (2006.01)
*C09D 11/037* (2014.01)
*C09D 175/04* (2006.01)
*C09D 133/00* (2006.01)
*C09D 163/00* (2006.01)
*B41M 3/14* (2006.01)

(52) U.S. Cl.
CPC .......... *C09D 7/1233* (2013.01); *C09D 11/037* (2013.01); *C09D 11/50* (2013.01); *C09D 133/00* (2013.01); *C09D 163/00* (2013.01); *C09D 175/04* (2013.01); *B41M 3/14* (2013.01); *B41M 3/144* (2013.01); *C08K 2003/221* (2013.01)

(56) References Cited

FOREIGN PATENT DOCUMENTS

| | | |
|---|---|---|
| WO | WO-98/27170 A1 | 6/1998 |
| WO | WO-2004/081125 A1 | 9/2004 |
| WO | WO-2008/065085 A1 | 6/2008 |

OTHER PUBLICATIONS

Second Written Opinion of the ISA, ISA/AU, Woden ACT, mailed Feb. 19, 2014.
Third Written Opinion of the ISA, ISA/AU, Woden ACT, mailed Aug. 19, 2014.
International Preliminary Report on Patentability with annexes, IPEA/AU, Woden ACT, mailed Oct. 20, 2014.

\* cited by examiner

COMPOSITION

CROSS-REFERENCE TO RELATED APPLICATIONS

This application is a 371 U.S. National Stage of International Application No. PCT/AU2013/000656, filed on Jun. 19, 2013, which claims priority to Australian Patent Applications numbers 2012902570, filed on Jun. 19, 2012 and 2012211401, filed on Aug. 6, 2012. The entire disclosures of the above applications are incorporated herein by reference.

TECHNICAL FIELD

The present invention relates to a composition for the marking of assets.

BACKGROUND ART

The following discussion of the background art is intended to facilitate an understanding of the present invention only. The discussion is not an acknowledgement or admission that any of the material referred to is or was part of the common general knowledge as at the priority date of the application.

For many companies and organisations, a large share of the value on the company balance sheet can be attributed to their tangible assets. Mining companies, for example, can spend many millions of dollars in purchasing and maintaining equipment and vehicles. For such large businesses, it is often a complex process to keep track of all of their assets and invariably, valuable assets may become misplaced or even worse, stolen costing these companies millions of dollars each year in replacements.

As a means to reduce or prevent this loss of assets, companies have for a long time marked their assets with their trade marks or other marks, registration numbers or bar codes to assist them and other persons in identifying their assets in the event they are misplaced or stolen. Unfortunately, it is common practice for thieves to deface or cover over these marks, numbers and codes making it considerably difficult for police or other authorities to identify the origin and owners of recovered stolen goods.

The invention presented herein was developed to provide an alternative asset marking product to provide the consumer with a useful or commercial choice.

SUMMARY OF INVENTION

In accordance with the present invention, there is provided a composition for the marking of assets comprising:
 a base material; and
 two or more encoding compounds;
wherein each of the two or more encoding compounds are provided at measurable concentrations within the composition and in concentration ratios that are unique to a desired property of the asset.

In accordance with the present invention, there is further provided a composition for the marking of assets comprising:
 a base material; and
 two or more encoding compounds homogenously dispersed throughout the base material;
wherein each of the two or more encoding compounds are provided at measurable concentrations within the composition and in concentration ratios that are unique to a desired property of the asset.

Preferably, the two or more encoding compounds are soluble in a solvent. Still preferably, the solvent is a volatile solvent such as ethanol or a low boiling hydrocarbon. Suitable low boiling hydrocarbons include methylated spirits, mineral turpentine, white spirits, kerosene, acetone, and xylene.

Advantageously, by providing each of the two or more encoding compounds at measurable concentrations, it is possible to provide a composition with a unique combination of encoding compound concentration ratios. This enables a potentially infinite number of unique combinations, without the requirement of a large number of encoding compounds. Chemical analysis of the concentrations of all of the two or more encoding compounds in the composition and comparison against a database enables the owner or source of the marked asset to be identified.

Preferably, the encoding compounds are metal compounds. More preferably, the encoding compounds are selected from the group comprising rare earth compounds, a zirconium compound and a hafnium compound. In the context of the present invention, the term rare earth shall be taken to encompass all of the lanthanides other than promethium as well as scandium and yttrium.

The encoding compounds may be inorganic compounds, organic compounds or organometallic compounds. The form of the encoding compound will be influenced by the choice of metal, compound solubility in the base material and the proposed method of application.

Inorganic compounds may be provided as oxides, hydroxides, halides, carbonates, hydroxycarbonates, nitrides and phosphates.

Organic compounds may be provided as ligands bonding through oxygen, nitrogen and/or sulfur atoms. Such ligands may be uni-, bi- or multi-dentate. Preferred ligands include unsubstituted hydroxy acids such as oxalic, citric and tartaric acids, substituted hydroxy acids such as (2-hydroxyethyl)ethylene diamino triacetic acid, acetic acids such as ethylenediaminetetraacetic acids, ketones including β-diketones such as acetylacetonates.

In a preferred form of the invention, the encoding compounds are acetylacetonate hydrates.

Preferably, the concentration of each of the encoding compounds is at least 1 ppm.

Preferably, the base material is safe to handle, easy to apply and suitable for application on a range of substrates (metal, glass, material etc.) as well as have a high resistance to degradation through physical or chemical attack.

The base material may be provided as a one or two part system in which the other components of the composition can exist in a chemically stable state. Potential base material may be organic based, water based, or air cured.

The base material may be selected from the group comprising polyurethanes, resins, adhesives and sealants. More specifically, the base material is selected from the group comprising two-part epoxy coatings, two-part estapol coatings, one-part acrylate base coatings and one-part water based coatings.

UV reactive resins may be used as the base material. UV reactive resins utilise photochemical reactions which convert a liquid organic compound to a hard plastic or coating. The resin is usually made of oligomers, monomers, a resin and a coupling reagent. The coupling agent, or photoinitiator, reacts to UV light to initiative polymerisation of the resin. The oligomer provides the backbone of the polymer and the monomer crosslinks it together. As opposed to standard resins, which involve a drying process in which the solvent is evaporated, the UV reactive resins can be quickly cured through the use of a UV lamp.

Specific forms of base materials include resin with 33% styrene, 30-60% methyl ethyl ketone peroxide, >60% isocyanates, polyurethane with >20% mineral turpentine, polyurethane, 2-part System: 89% epoxy: 10% tertiary amine hardener, 2-part System: 60% epoxy: 35% alkyl amine hardener, 2-part System: 90% epoxy (bisphenol A-epoxy resin): 10% tertiary amine hardener, resin with 33% styrene; 2-part system: 40% styrene: 30-60% methyl ethyl ketone peroxide hardener, aliphatic petroleum distillates and toluene, aliphatic polyurethane, 47% isocyanate and xylene and acrylic polyurethane, ethyl 3-ethoxy propionate resin, 47% polymeric isocyanate resin and n-butyl acetate, xylene, resin with 1,2-propanediol, polyvinyl acetate, cyanoacrylate resin and poly(methyl methacrylate), polychloroprene, polyurethane, solvent based copolymer, polydimethylsiloxane, isocyanates, alkyd resin, phosphoric acid, aliphatic polyurethane, polymeric isocyanate, silane compounds and polymeric copolymers.

In one form of the invention, the composition is substantially invisible to the naked eye.

The composition may comprise a marker. The marker may be an overt marker such as a pigment or dye, or a covert marker such as fluorescent or radioactive marker.

Preferably, the fluorescent marker is visible upon inspection with an ultra violet (UV) light source. Use of a fluorescent marker is particularly advantageous when the composition is invisible or substantially invisible to the naked eye.

Preferably, the concentration of fluorescent marker is between 0.05% and 2%.

The fluorescent marker should be robust enough to survive the challenging conditions of the climate. Ideally, a mineral-based fluorescent compound can be utilised, as these are considered to be robust and are likely to withstand the conditions presented. Synthetically prepared and chemically inorganic-based fluorescent compounds can also be used. An example is an organic based dye in conjunction with a rare earth doped oxide.

The composition can include one or more of any suitable fluorescent materials. Potential fluorescent markers that may be used include couarin, oxazinone, fluorescein and stilbene derivatives. Possible coumarin derivatives include 7-hydroxy-4-methyl coumarin or 7-diethylamino-4-methyl coumarin.

In one form of the invention, the composition further comprises a diluent in order to decrease the viscosity of the composition. Dilution of the composition decreases the viscosity of the product and thus facilitates a greater choice of application, in that sprayable or brush-on products can be developed. The diluent selected will ideally be a colourless liquid so as to not affect the final colour of the final solution.

Preferred diluents include water, milliQ ultra-pure water, ethanol, methylated spirits, mineral turpentine, white spirits, kerosene, acetone, and xylene or low boiling hydrocarbon.

When a 2-part epoxy system is utilised, methylated spirits advantageously provides the short chain alcohol necessary for the cross-linking.

It will be appreciated that the composition may further comprise one or more stabilisers, surfactants, paints, binders and non-volatile solvents to facilitate application of the composition to the asset and/or adherence of the composition to the asset.

In accordance with the present invention, there is provided a method for the marking and identification of assets comprising the steps of;

assigning a unique ratio of concentrations of two or more encoding compounds to a desired property of an asset;

preparing a composition containing the unique ratio of said two or more encoding compounds within the composition; and applying said composition to the asset, such that analysis of the concentration ratios of the encoding compounds in the composition on the asset and comparison against a database of unique ratios enables the desired property of the asset to be identified.

Preferably, the composition includes a base material.

The desired property of the asset may be the owner of the asset, the location of the asset or the source of the asset.

In a preferred embodiment, the step of preparing the composition, includes the step of dissolving the two or more encoding compounds in a solvent. Still preferably, the solvent is a volatile solvent such as ethanol or a low boiling hydrocarbon. Suitable low boiling hydrocarbons include methylated spirits, mineral turpentine, white spirits, kerosene, acetone, and xylene.

Preferably, the encoding compounds are metal compounds. More preferably, the encoding compounds are selected from the group comprising rare earth compounds, a zirconium compound and a hafnium compound. In the context of the present invention, the term rare earth shall be taken to encompass all of the lanthanides other than promethium as well as scandium and yttrium.

The encoding compounds may be inorganic compounds, organic compounds or organometallic compounds. The form of the encoding compound will be influenced by the choice of metal, compound solubility in the base material and the proposed method of application.

Inorganic compounds may be provided as oxides, hydroxides, halides, carbonates, hydroxycarbonates, nitrides and phosphates.

Organic compounds may be provided as ligands bonding through oxygen, nitrogen and/or sulfur atoms. Such ligands may be uni-, bi- or multi-dentate. Preferred ligands include unsubstituted hydroxy acids such as oxalic, citric and tartaric acids, substituted hydroxy acids such as (2-hydroxyethyl)ethylene diamino triacetic acid, acetic acids such as ethylenediaminetetraacetic acids, ketones including β-diketones such as acetylacetonates.

In a preferred form of the invention, the encoding compounds are acetylacetonate hydrates.

In one form of the invention, the composition is substantially invisible to the naked eye.

The composition may comprise a marker. The marker may be an overt marker such as a pigment or dye, or a covert marker such as fluorescent or radioactive marker.

Preferably, the fluorescent marker is visible upon inspection with an ultra violet (UV) light source. Use of a fluorescent marker is particularly advantageous when the composition is invisible or substantially invisible to the naked eye.

Preferably, the concentration of fluorescent marker is between 0.05% and 2%.

The fluorescent marker should be robust enough to survive the challenging conditions of the climate. Ideally, a mineral-based fluorescent compound can be utilised, as these are considered to be robust and are likely to withstand the conditions presented. Synthetically prepared and chemically inorganic-based fluorescent compounds can also be used. An example is an organic based dye in conjunction with a rare earth doped oxide.

The composition can include one or more of any suitable fluorescent materials. Potential fluorescent markers that may be used include couarin, oxazinone, fluorescein and stilbene derivatives. Possible coumarin derivatives include 7-hydroxy-4-methyl coumarin or 7-diethylamino-4-methyl coumarin.

The composition may be applied to the asset by any method known in the art including painting and by aerosol.

The database will preferably include the desired property of the asset together with the theoretical concentrations of encoding compounds and the results of the analysis of a sample of the prepared composition.

The analysis of the composition may be performed by any method known in the art including solution-based Inductively Coupled Plasma-Mass Spectrometry (ICP-MS) and Laser Ablation Inductively Coupled Plasma-Mass Spectrometry (LA-ICP-MS).

When an asset is to be identified, the composition will be analysed. The composition may be analysed either in-situ or after removal of at least a portion of the composition from the asset, for example, by scraping or swabbing. The results will then be compared to the theoretical and analysed composition of the unique ratio of concentrations stored on the database. The desired property of the asset can then be identified.

Preferably, removal of at least a portion of the composition from the asset, more specifically comprises swabbing the composition with a solvent swab. Still preferably, the solvent swab is a methylated spirits swab or a 2-5% nitric acid swab.

BRIEF DESCRIPTION OF THE DRAWINGS

The present invention will now be described, by way of example only, with reference to one embodiment thereof and the accompanying drawings, in which.

DESCRIPTION OF EMBODIMENTS

Figure 1:
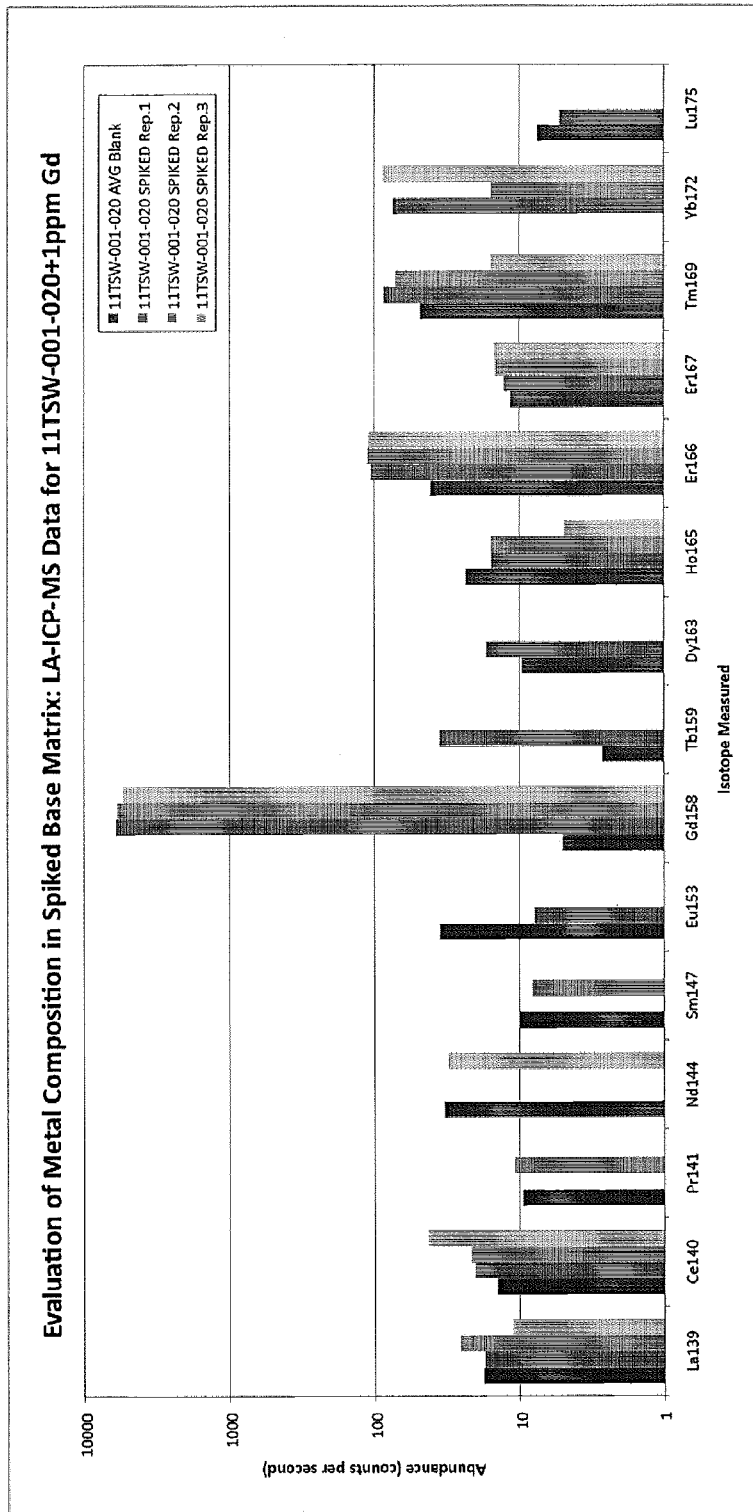
FIG. 1 is a graphical representation of the results of the analysis of a reference panel by LA-ICP-MS

Throughout this specification, unless the context requires otherwise, the word "comprise" or variations such as "comprises" or "comprising", will be understood to imply the inclusion of a stated integer or group of integers but not the exclusion of any other integer or group of integers.

The base material is preferably colourless, chemically stable, with a low viscosity and low volatility. Various bases have been examined both physically and chemically to determine the most suitable.

Water-based options generally possess a low chemical odour, low flammability, easy workability and fast drying time. Compositions prepared using water based materials can be diluted with water and when applied using a brush, are touch dry within 10 minutes.

Air cured bases may be presented as an option for a single use application. That is, supplied in a small bottle with a brush. These bases offer a fast drying coating (minutes) with good wear and moderate chemical resistance.

Based on the various component assessments and mixing trials undertaken, the following four base materials were investigated in greater detail:
1) Fibreglass Casting Resin containing Resin with 33% styrene;
2) Polyurethane;
3) Epoxy Resin containing 2-part System: 60% epoxy, 35% alkyl amine hardener; and
4) Two part polyurethane containing ethyl 3-ethoxy propionate resin, a 47% polymeric isocyanate resin, n-butyl acetate and a xylene thinning agent.

A large number of different adhesives, sealants and coatings have been investigated during product development, as the final product should adhere strongly to a variety of differing substrates.

In situations where the particular asset is subject to both harsh environmental exposure and mechanical wear, the composition needs to be increasingly robust. In such situations, the selection of the individual components of the composition is important. For example, the following combination of components would be suitable for the marking of an earth moving vehicle on a mine site, where the asset is likely to be subjected to harsh mechanical wear and environmental exposure.

| Base | Diluent | Dilution | Fluorescent Marker | Encoding compounds |
| --- | --- | --- | --- | --- |
| Chemically Cured Epoxy Resin | Methylated Spirits | 25% | 1% | Acetylacetonate |

The selection of the individual components is of course highly dependent on the desired application of the products. Whilst the above combination of components offers a very robust final product, it may not be suitable for all situations. The following compositions were found to provide their own specific advantages and are intended for particular applications:

Fast Drying Time.

| Base | Diluent | Dilution | Fluorescent Marker | Encoding compounds |
| --- | --- | --- | --- | --- |
| Chemically Cured Polyurethane | Reducer (contains xylene) | 10% | 1% | Acetylacetonate |

One-Part System Requiring No Mixing.

| Base | Diluent | Dilution | Fluorescent Marker | Encoding compounds |
| --- | --- | --- | --- | --- |
| Acrylate Resin | Acetone | 50% | 1% | Acetylacetonate |

Low Volatility and Odour for Enclosed Space Applications.

| Base | Diluent | Dilution | Fluorescent Marker | Encoding compounds |
| --- | --- | --- | --- | --- |
| Water Based Acrylic Resin | Water | 50% | 1% | Acetylacetonate |

To ensure the encoding compounds could be incorporated and detected, it was necessary to first determine the baseline concentration of encoding compounds in each of the components utilised in the final composition. The baseline concentrations refer to the metal concentrations that are present in the composition (base material, diluent and fluorescent etc) prior to addition of the encoding compound. For example, if base 1 contained Gd, and Gd was selected as the encoding chemical, analysis of the reference panel may not report the same ratio as the analyst had intended. This is of particular relevance where encoding compounds are added at low levels.

Drops of samples of the base material were transferred onto Perspex laser discs and cured for 24 hr at 40° C. Each sample was ablated in triplicate to determine the baseline concentration of encoding compounds. The composition of the base material was determined using laser ablation inductively coupled plasma mass spectrometry (LA-ICP-MS), with the analysis undertaken over a number of days. A Certified Reference Material, the National Institute of Standards & Technology (NIST) 610 glass standard, was analysed periodically throughout each day when analyses were performed. Data was drift corrected and normalised to values obtained for the NIST 610 standard to account for variations in instrument sensitivity occurring both within a single day and during the days of analysis. Assessment of the resulting data revealed that replicate analyses performed on the same sample were consistent with each other, supporting the hypothesis that the dried material was homogeneous. Additionally, the LA-ICP-MS data was used to provide an indication as to which base matrices had low-level metal concentrations.

The addition of diluents to a product could contribute significant amounts of metals to its overall composition. This is particularly pertinent to diluents which are cheap and produced in bulk as these are often much lower in purity. As per the analysis of base materials, all diluents were analysed to determine their elemental composition. No rare earths, zirconium or hafnium were detected in the diluents.

The fluorescent compounds were analysed for potential encoding compounds. As these pigments can be rare earth element doped, some of the encoding compounds were detected. This is not considered a problem as it is envisaged that these compounds would also be used to compliment the unique composition created by the encoding compounds.

It is necessary to include a unique combination of encoding compounds in the product used for a particular asset owner. It has been found that it is possible to reliably incorporate quantitative amounts of these encoding compounds. The ability to do this has facilitated the ability to create multiple unique compositions using the same encoding compounds by simply varying their concentrations and hence ratios of the encoding compounds to each other. This is achieved through the use of exact masses/volume and calculation of exact concentrations. Analysis of the final composition is also undertaken to ensure the final concentrations are correctly recorded. With this capability there is a near infinite number of compositions possible.

The encoding compounds should be incorporated as homogenously as possible into the composition. Two methods were used to incorporate the encoding compounds into the base material:
(i) direct incorporation of the solid encoding compounds, with the aim for it to either completely dissolve in the base material or uniformly dissipate as a suspended solid; or
(ii) solubilisation of the encoding compounds in a solvent to facilitate homogenous incorporation as a solution in the base material.

Method (i) was utilised for the rare earth oxides and method (ii) for rare earth acetylacetonates.

With direct incorporation, the correct amount of solid encoding chemical was stirred into a small amount of base material and mixed thoroughly to ensure that the particles did not clump together and all surfaces of each particle of encoding chemical was wetted. The resulting paste was transferred into a larger volume of base material and shaken to assist with dissipation of the particles throughout the liquid.

Due to the fine particulate nature of the solid rare earth oxides, care was required to incorporate them into the base material homogeneously. In an attempt to assist in homogeneous dispersion, the exterior surface of the particles were coated in a small amount of the base material prior to being mixed with the final base material. To further assist with distribution, the coated particles were also agitated.

Acetylacetonate encoding compounds were dissolved to a set concentration in solution and the solutions were added to the base material dropwise to achieve the desired final concentration.

The ability to incorporate the acetylacetonate encoding compounds as a solution is preferred, as choice of a solvent that is miscible with the base material it is being dispensed into will result in homogenous distribution of the encoding compounds.

Solubility trials were conducted to test which solvents would improve incorporation of the acetylacetonate encoding compounds into the base material. Samples (~5 mg) of each of four acetylacetonate compounds were dissolved in methylated spirits. Methylated spirits was used to prepare subsequent concentrated acetylacetonate encoding compound solutions, encoding compound solutions were added to the different bases to test for miscibility. The encoding compound concentrations in the resulting bases measured using established LA-ICP-MS protocols. It was demonstrated that, with dissolution of the encoding compounds in methylated spirits, it was possible to quantitatively incorporate the encoding compounds into the base material. In addition, the results demonstrated that it was possible to add the encoding compounds at a concentration as low as 1 ppm.

The concentration of the fluorescent material was set to 1 volume % to provide sufficient intensity, whilst maintaining the low colour desired in the final product.

Application of the Composition

The composition of the present invention is intended to be suitable for application by conventional methods, such as brush or spray applicator. The use of a spray applicator results in a fine mist layer being evenly applied to the asset. This aids with the reduction of the visibility of the composition and the drying time.

In the case where a UV reactive monomer is provided in the base material, then a curing step is also required during application. Once the composition has been applied to the asset, a UV curing lamp (265 nm) is shone on the composition until the composition has hardened.

It is intended that each batch of the composition will be provided with a unique bottle identification number (barcode). A small sample of the composition will be analysed and the results will be stored in a database with the theoretical composition, bottle identification number and the client. The sample should be analysed after application to a surface and sampled in the same way that a composition on an asset would be analysed. An example of the results from analysis of a gadolinium-encoded product is illustrated in FIG. 1.

In this manner, each time a new composition is assigned to a client, they will be added to an identification database. The database will comprise details regarding the actual chemistry, as determined during production of the composition and analysis of the manufactured product.

The reference panels allows for increased certainty when identifying an asset marked with the composition of the present invention. A sample of the composition retrieved from the asset will be analysed, and compared to the theoretical concentrations of components stored on the system in order to determine the owners of the asset.

FIG. 1 demonstrates that it is possible to reproducibly analyse a sample of the composition of the present invention and identify the presence of the encoding materials. Using LA-ICP-MS, concentrations as low as 1 ppm can be consistently measured. The encoding chemicals will typically be added in concentration range of between 1-1000 ppm.

The analysis can determine the following from the sample provided:
(i) whether a particular encoding compound is present or not;
(ii) the ratios of the concentrations of the encoding compounds; and
(iii) the concentrations of the encoding compounds present. This is important where ratios for two different clients may be the same, but the actual concentration varies significantly (i.e. 50 ppm Ho, 100 ppm Er for client #1 or 5 ppm Ho, 10 ppm Er for client #2).

There are different protocols available for the analysis of a product detected on an asset. These methods included:
(i) analysis of the coating in-situ (that is on the item) by LA-ICP-MS;
(ii) analysis of scraping material from the asset by LA-ICP-MS; and
(iii) analysis of a swabbing of the asset by ICP-MS.

Swabbing of the sample may be carried out with a methylated spirits swap or a 2-5% nitric acid swab.

All of the sampling methodologies tested afforded results that enabled the identification of the encoding compounds used. For ratio determination to be possible it is preferred that a scraping of the coating be obtained and this sample analysed by LA-ICP-MS. However, depending on the base material, a swap with methylated spirits and/or 5% nitric acid may also allow for ratio determination.

Example

A sample for analysis was prepared from the surface of a marked asset and analysed by LA-ICP-MS to identify the encoding compounds present.

Figure 2:
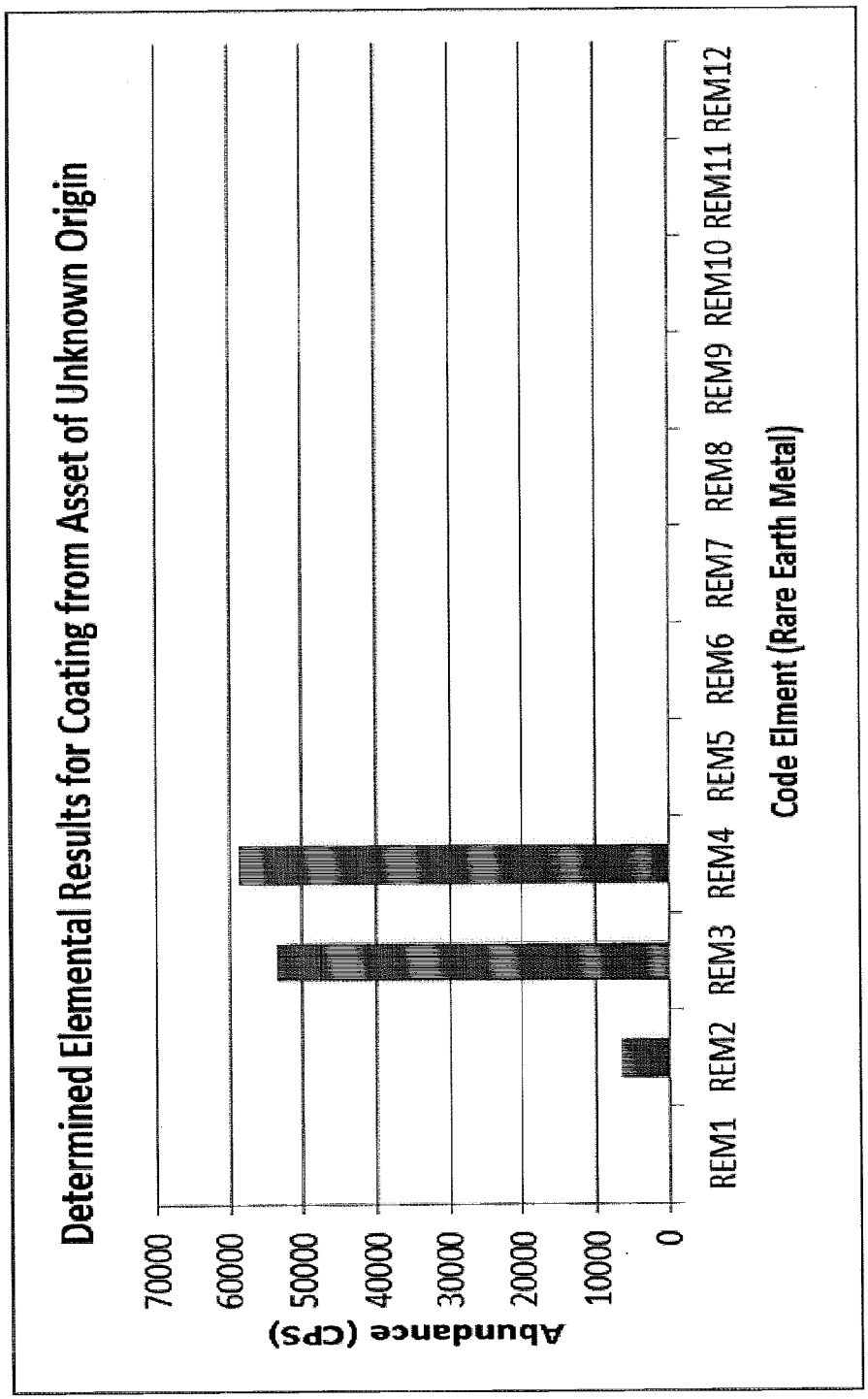
FIG. 2 is a graphical representation of the elemental results of the analysis of an unknown sample.

The first pass in the analysis of the results was to qualitatively identify the presence of encoding compounds and compare the results to the database. The initial qualitative analysis rapidly reduced the number of potential asset owners. FIG. 2 presents the analytical results and identifies the presence of REM2, REM3 and REM4 where the terms REM2, REM3 and REM4 were used to identify three rare earth metals. Comparison of these results against the database identified four potential asset owners, designated clients A, B, C and D.

Table 1 provides the raw data (cps) for the analysis of the reference panels for clients A to D. This raw data was compared against the raw data for the unknown sample to facilitate the identification of the owner of the asset. The raw data indicated that the owner of the asset was Client D. The ratios of the raw data for the unknown was also compared against the ratios of the raw data for the analysis of the reference panels for clients A to D. Comparison of the ratios also identified the owner of the asset as client D. It is important to compare both the raw data and the ratios as it is possible that the database may contain information for two clients whose reference panels contains the same ratios of encoding compounds, but different absolute concentrations of encoding compounds. This enables an even greater number of potential combinations of encoding compounds to be prepared.

By way of backup, the database will also contain a comparison of the theoretical ratios, calculated on the basis of the amounts of encoding compounds actually added to the composition and the ratios measured by analysis of the reference panels.

TABLE 1

Comparison of results.

| | Abundance (CPS) | | | Calculated Ratios | | |
| --- | --- | --- | --- | --- | --- | --- |
| | REM 2 | REM 3 | REM 4 | REM 2:3 | REM 2:4 | REM 3:4 |
| Client A | 29514 | 29946 | 62554 | 1 | 0.5 | 0.5 |
| Client B | 59224 | 2988 | 7100 | 19.8 | 8.3 | 0.4 |
| Client C | 2789 | 54276 | 6721 | 0.05 | 0.4 | 8.1 |
| Client D | 5812 | 62892 | 67704 | 0.09 | 0.09 | 0.9 |
| Unknown | 6663 | 58965 | 60124 | 0.11 | 0.11 | 1 |

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

The invention claimed is:

1. A composition for the marking of assets comprising:
a base material selected from the group consisting of one-part and two-part epoxy coatings, one-part and two-part polyurethane coatings, one-part and two-part acrylate base coatings, one-part water based coatings and UV reactive resins; and
two or more organometallic encoding compounds selected from the group consisting of rare earth compounds, zirconium compounds and hafnium compounds,
wherein each of the two or more organometallic encoding compounds are provided at measurable concentrations within the composition and the ratio of concentrations of each of the organometallic encoding compounds relative to the concentration of the other organometallic encoding compounds are unique to a desired property of the asset.

2. The composition for the marking of assets according to claim 1, wherein the two or more encoding compounds are homogenously distributed throughout the base material.

3. The composition for the marking of assets according to claim 1, wherein the two or more encoding compounds are soluble in a solvent.

4. The composition for the marking of assets according to claim 3, wherein the solvent is ethanol or a low boiling hydrocarbon.

5. The composition for the marking of assets according to claim 1, wherein the encoding compounds are acetylacetonate hydrates.

6. The composition for the marking of assets according to claim 1, wherein the concentration of each of the encoding compounds is at least 1 ppm.

7. The composition for the marking of assets according to claim 1, wherein the composition is substantially invisible to the naked eye.

8. The composition for the marking of assets according to claim 1, wherein the composition further comprises a marker.

9. The composition for the marking of assets according to claim 8, wherein the marker is a fluorescent marker.

10. The composition for the marking of assets according to claim 9, wherein the concentration of the fluorescent marker is between 0.05% and 2%.

11. A method for the marking and identification of assets comprising the steps of:
    assigning a unique ratio of the concentrations of two or more organometallic encoding compounds to a desired property of an asset, where the two or more organometallic encoding compounds are selected from the group consisting of rare earth compounds, zirconium compounds and hafnium compounds;
    preparing a composition which contains the unique ratio of said two or more organometallic encoding compounds within the composition; and
    applying said composition to the asset,
such that analysis of the ratio of the concentrations each of the organometallic encoding compounds relative to the concentration of the other organometallic encoding compounds in the composition on the asset and comparison against a database of unique ratios enables the desired property of the asset to be identified.

12. The method for the marking and identification of assets according to claim 11, wherein the composition includes a base material selected from the group consisting of one-part and two-part epoxy coatings, one-part and two-part polyurethane coatings, one-part and two-part acrylate base coatings, one-part water based coatings and UV reactive resins.

13. The method for the marking and identification of assets according to claim 11, wherein the step of preparing the composition, includes the step of dissolving the two or more organometallic encoding compounds in a solvent.

14. The method for the marking and identification of assets according to claim 11, wherein the encoding compounds are acetylacetonate hydrates.

15. The method for the marking and identification of assets according to claim 11, wherein the composition is analysed either in-situ or after removal of at least a portion of the composition from the asset.

16. The method for the marking and identification of assets according to claim 15, wherein removal of at least a portion of the composition from the asset, comprises swabbing the composition with a solvent swab.

17. The method for the marking and identification of assets according to claim 16, wherein the solvent swab is a methylated spirits swab or a 2-5% nitric acid swab.

18. The method for the marking and identification of assets according to claim 11, wherein the database will include a theoretical organometallic encoding compound composition, an organometallic encoding compound composition as analysed during manufacture.

* * * * *

UNITED STATES PATENT AND TRADEMARK OFFICE
CERTIFICATE OF CORRECTION

| | |
|---|---|
| PATENT NO. | : 9,714,351 B2 |
| APPLICATION NO. | : 14/409817 |
| DATED | : July 25, 2017 |
| INVENTOR(S) | : Cameron Jay Scadding et al. |

It is certified that error appears in the above-identified patent and that said Letters Patent is hereby corrected as shown below:

On the Title Page

Column 1, (71) Applicant, Line 3, Delete "Austrailia" and insert --Australia-- therefor Column 1, (72) Inventors, Line 2, Delete "Rachel Louis Scadding," and insert --Rachel Louise Scadding,-- therefor Column 2, (57) Abstract, Line 3, After "compounds", insert --,--

In the Specification

Column 5, Brief Description of the Drawings, Line 36, After "LA-ICP-MS", insert --, and--

Column 7, Description of Embodiments, Line 2, Delete "40° C." and insert --40 °C.-- therefor Signed and Sealed this
Third Day of October, 2017

Joseph Matal
*Performing the Functions and Duties of the*
*Under Secretary of Commerce for Intellectual Property and*
*Director of the United States Patent and Trademark Office*